(12) United States Patent
Josephson et al.

(10) Patent No.: US 12,054,183 B2
(45) Date of Patent: Aug. 6, 2024

(54) OPEN TOP GONDOLA RAILCAR (71) Applicant: JAC Operations, Inc., Chicago, IL (US)

(72) Inventors: Greg P. Josephson, Salix, PA (US); Michael H. Kress, Armagh, PA (US); Kerry Sauter, Sidman, PA (US); Robert J. Roxby, Portage, PA (US); Cloyd Wirick, Mineral Point, PA (US)

(73) Assignee: JAC OPERATIONS, INC., Chicago, IL (US)

(*) Notice: Subject to any disclaimer, the term of this patent is extended or adjusted under 35 U.S.C. 154(b) by 987 days.

(21) Appl. No.: 17/018,536

(22) Filed: Sep. 11, 2020

(65) Prior Publication Data
US 2021/0039685 A1    Feb. 11, 2021

Related U.S. Application Data (63) Continuation of application No. PCT/US2019/021892, filed on Mar. 12, 2019.

(60) Provisional application No. 62/641,614, filed on Mar. 12, 2018.

(51) Int. Cl.
| | |
|---|---|
| *B61D 3/08* | (2006.01) |
| *B61D 3/00* | (2006.01) |
| *B61D 7/00* | (2006.01) |
| *B61D 17/04* | (2006.01) |
| *B61F 1/02* | (2006.01) |
| *B61F 1/12* | (2006.01) |
| *B61F 1/14* | (2006.01) |

(52) U.S. Cl.
CPC ............... *B61D 3/08* (2013.01); *B61D 3/00* (2013.01); *B61D 7/00* (2013.01); *B61D 17/04* (2013.01); *B61F 1/02* (2013.01); *B61F 1/12* (2013.01); *B61F 1/14* (2013.01)

(58) Field of Classification Search
CPC ... B61D 3/00; B61D 3/08; B61D 3/16; B61D 7/00; B61D 17/00; B61D 17/04; B61D 17/041; B61D 17/08; B61D 49/00; B61F 1/12; B61F 1/02; B61F 1/14
See application file for complete search history.

(56) References Cited

U.S. PATENT DOCUMENTS

| | | |
|---|---|---|
| 2,681,470 A | 6/1954 | Johnson |
| 2,722,899 A | 11/1955 | Brown |

(Continued)

FOREIGN PATENT DOCUMENTS

CN    107672612 A * 2/2018 ............. B61D 17/06

*Primary Examiner* — Zachary L Kuhfuss
*Assistant Examiner* — Cheng Lin
(74) *Attorney, Agent, or Firm* — Blynn L. Shideler; Krisanne Shideler; BLK Law Group (57) ABSTRACT An open top gondola car includes top chord sections; a pair of end walls and side walls coupled to the top chord structure, wherein each sidewall includes a side sheet a plurality of side stakes and side sill; and an underframe construction including a center sill running the length of the car, bolsters configured to be above truck assemblies and coupled to the center sill and a plurality of lateral I-Beam cross bearers that extend from the center sill toward and stopping short of the inside of the side sheet, and wherein the cross bearers include vertical connection plates configures for coupling to side stakes which are positioned between the bolsters.

8 Claims, 6 Drawing Sheets

(56) References Cited

U.S. PATENT DOCUMENTS

| | | | | |
|---|---|---|---|---|
| 3,079,874 | A * | 3/1963 | Hansen | B61D 45/008 |
| | | | | 105/410 |
| 3,319,585 | A * | 5/1967 | Pulcrano | B61D 17/08 |
| | | | | 105/401 |
| 4,212,252 | A | 7/1980 | Hart et al. | |
| 4,361,097 | A | 11/1982 | Jones et al. | |
| 4,911,082 | A | 3/1990 | Richmond | |
| 5,253,593 | A | 10/1993 | Kurtz et al. | |
| 5,335,603 | A | 8/1994 | Wirick et al. | |
| 5,488,912 | A | 2/1996 | Pileggi et al. | |
| 5,562,046 | A * | 10/1996 | Fetterman | B61F 1/12 |
| | | | | 105/396 |
| 5,813,353 | A | 9/1998 | Sauter | |
| 6,000,342 | A * | 12/1999 | Thoman | B61F 1/00 |
| | | | | 105/418 |
| 6,148,735 | A | 11/2000 | Sauter et al. | |
| 6,769,366 | B1 | 8/2004 | Lydic et al. | |
| 6,978,720 | B2 | 12/2005 | Johnson | |
| 7,434,519 | B2 | 10/2008 | Forbes et al. | |
| 7,461,600 | B2 * | 12/2008 | Forbes | B61F 1/12 |
| | | | | 105/396 |
| 7,559,284 | B2 | 7/2009 | Forbes et al. | |
| 7,757,611 | B2 | 7/2010 | Forbes et al. | |
| 7,878,125 | B2 | 2/2011 | Forbes et al. | |
| 8,025,014 | B2 | 9/2011 | Forbes et al. | |
| 8,132,515 | B2 | 3/2012 | Forbes et al. | |
| 8,240,256 | B2 | 8/2012 | Nutt | |
| 8,931,418 | B2 * | 1/2015 | Matsuoka | B61D 17/043 |
| | | | | 105/410 |
| 9,156,478 | B2 * | 10/2015 | Forbes | B61D 17/08 |
| 9,346,472 | B2 * | 5/2016 | Black | B61F 1/14 |
| 10,259,472 | B2 * | 4/2019 | Veit | B61D 45/003 |
| 2010/0006000 | A1 * | 1/2010 | Forbes | B61F 1/12 |
| | | | | 105/406.1 |
| 2017/0129504 | A1 | 5/2017 | Single | |

\* cited by examiner

OPEN TOP GONDOLA RAILCAR

RELATED APPLICATIONS

This application is a continuation of International Application Serial Number PCT/US2019/021892 filed Mar. 12, 2019 and published Sep. 19, 2019 as WO 2019/178127, which publication and application are incorporated herein by reference.

International Application Serial Number PCT/US2019/021892 claims the benefit of U.S. Provisional Patent Application Ser. No. 62/641,614 titled "Method and Cast Components for Cold Formed Center Sill Rail Car Modification Programs and Railcars Formed Thereby."

BACKGROUND OF THE INVENTION

1. Field of the Invention

The present invention relates to gondola style railroad cars, and more particularly to the underframe and sidewall structure of an open top gondola railcar.

2. Background Information

In the railroad art, rolling stock comprises all vehicles that move on a railway. A gondola railcar, or simply gondola, is an open-top type of rolling stock used for carrying loose bulk materials such as grain, coal, minerals, tracking sand, fertilizers, cement, etc.

Regarding the name "gondola", it has been noted that prior to the proliferation of rail transport a significant amount of coal in America was shipped via flat boats that were termed "gondolas," generally in satirical reference to the famous Venetian rowing boats. With the advancement of rail transport, the railroad cars first employed in the haulage of coal were thus named after these shallow-draft "gondola" boats and called "gondola cars".

In the second half of the 20th century, coal haulage on rails shifted from open hopper cars to high-sided gondolas. Using a gondola, the railroads are able to haul a larger amount of coal per car. Examples of gondola cars are illustrated in U.S. Pat. Nos. 4,212,252; 4,361,097; 4,911,082; 5,253,593; 5,335,603; 5,488,912; 5,813,353; 6,148,735; 6,978,720; 8,132,515; 8,240,256, which patents are incorporated herein by reference establishing the general nature of the relevant art.

The present invention is primarily related to open top gondola cars, but certain aspects of the invention may be used in other car types. The prior art has provided a variety of open top gondola railroad cars. The above listed patents are representative of the state of the art of gondola railcars. There remains a need for gondola railcar underframe and sidewall construction that simplifies construction and minimizes components, and minimizes car weight while yielding the necessary structural support without sacrificing cargo carrying capacity.

SUMMARY OF THE INVENTION

It is an object of the present invention to provide an open top gondola railcar with railcar underframe and sidewall construction that simplifies construction, minimizes car weight while yielding the necessary structural support without sacrificing cargo carrying capacity. The present invention provides these advantages and reduces components over prior designs thereby further reducing costs and standardizes components for ease of construction.

One aspect of the invention may be described as providing an open top gondola car includes top chord sections; a pair of end walls and side walls coupled to the top chord structure, wherein each sidewall includes a side sheet a plurality of side stakes and side sill; and an underframe construction including a center sill running the length of the car, bolsters configured to be above truck assemblies and coupled to the center sill and a plurality of lateral I-Beam cross bearers that extend from the center sill toward and stopping short of the inside of the side sheet, and wherein the cross bearers include vertical connection plates configures for coupling to side stakes which are positioned between the bolsters.

These and other advantages of the present invention will be clarified in the brief description of the preferred embodiment taken together with the drawings in which like reference numerals represent like elements throughout.

DESCRIPTION OF THE PREFERRED EMBODIMENTS

The present invention provides an open top gondola railcar 10 with railcar underframe and sidewall construction that simplifies construction, minimizes car weight while yielding the necessary structural support without sacrificing cargo carrying capacity. It will be apparent that various features of the present invention can easily be implemented in other car gondola style cars types.

Each railcar 10 includes a number of conventional features that need not be described herein in detail as they are generally well known in the art such as a pair of spaced trucks (shown partially in FIG. 9) and coupler assemblies for connecting adjacent cars, and generally only the underframe and sidewall construction are described in detail herein.

Each railcar 10 includes top chord sections 12 above the sidewalls and end-walls. Extruded closed sections can effectively form the top chord sections 12 although other top chord configurations are possible. The railcar 10 includes a pin connection or coupling 14 between the end wall top chord 12 and the side wall top chord 12 as shown.

The end-walls are generally formed of end sheet 16 and cross supports 18. The end sheet 16 can be formed a plurality of coupled sheet materials extending from the top chord 12 to the floor structure, however one piece structure forming the end sheet 16 is preferred. The cross supports may be extruded channel sections, I-beam, t-sections or a variety of supporting beam shapes.

Figure 4:
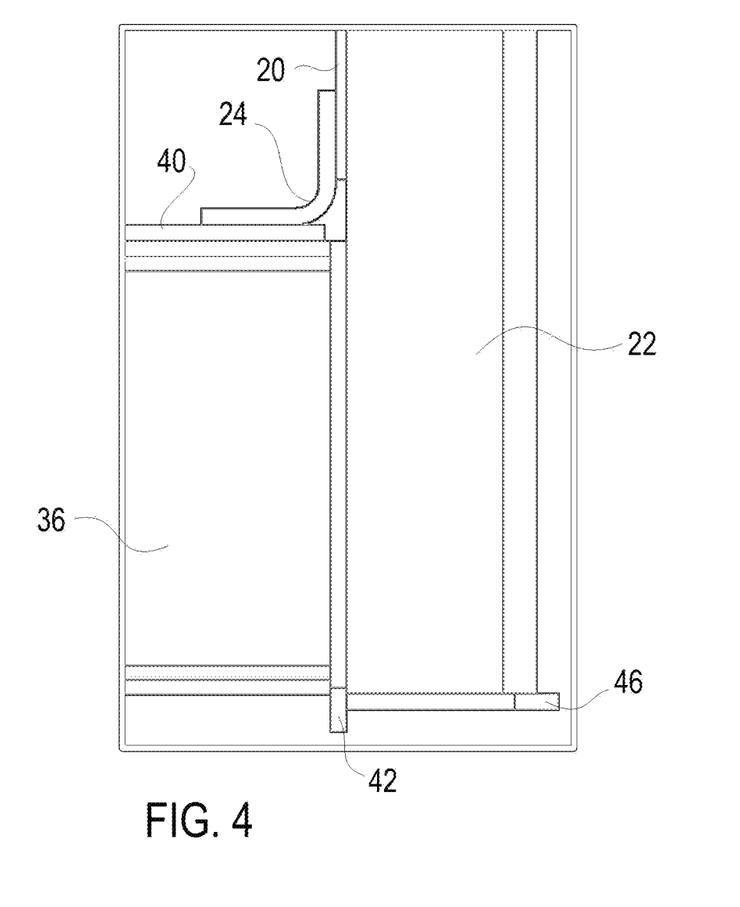
FIG. 4 is an enlarged sectional end view of the cross bearer and side stake coupling of the gondola railcar according to FIG. 1.
Figure 5:
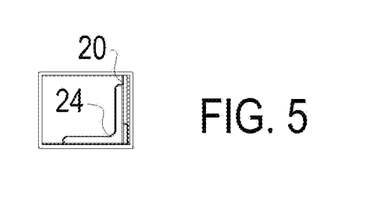
FIG. 5 is an enlarged sectional end view of an alternative side sill of the gondola railcar according to FIG. 1.

The sidewalls are generally formed of side sheet 20, side stakes 22 and side sill 24. The side sheet 20 can be formed a plurality of coupled sheet materials extending from the top chord 12 to the side sill 24, however a single sheet forming the side sheet 20 is preferred. The side stakes 22 are coupled to the top chord 12 and the side sheet 20 and are preferably mainly formed as extruded channels and will be described further below. The side sill 24 may be a closed section like the top chord 12, or other conventional shape such as a solid bar, but a pressed angle or structural angle as shown best in FIGS. 4 and 5 is preferred as it represents a cost effective design that does not take away from the cargo carrying capacity of the railcar 10.

Two more conventional side stakes (22' and 22") differ from the side stake 22 construction between the bolsters that, as described below, form an important part of the design of the railcar 10 of the present invention. The first more conventional side stake is a ladder side stake 22' at the ends of each sidewall and in addition to a side stake it forms an attaching point for a corner ladder 26. The ladder side stake 22' is not associated with a cross bearer and mainly functions as a side wall support and as one attachment for the corner ladder 26. The second specialized side stake is the bolster side stake 22" that extends from the top chord 12 to a laterally extending part of a bolster 28. The bolster side stake 22" sees more structural loading and is generally thicker and/or dimensioned larger (e.g. a wider channel) to accommodate the extra loading. The bolster side stake 22" may also be internally reinforced as with side stakes 22 discussed below, however as shown the bolster 28 includes a horizontal coupling portion and a vertical bolster to side connection plate making further reinforcement of the bolster side stake 22" less needed.

Figure 8:
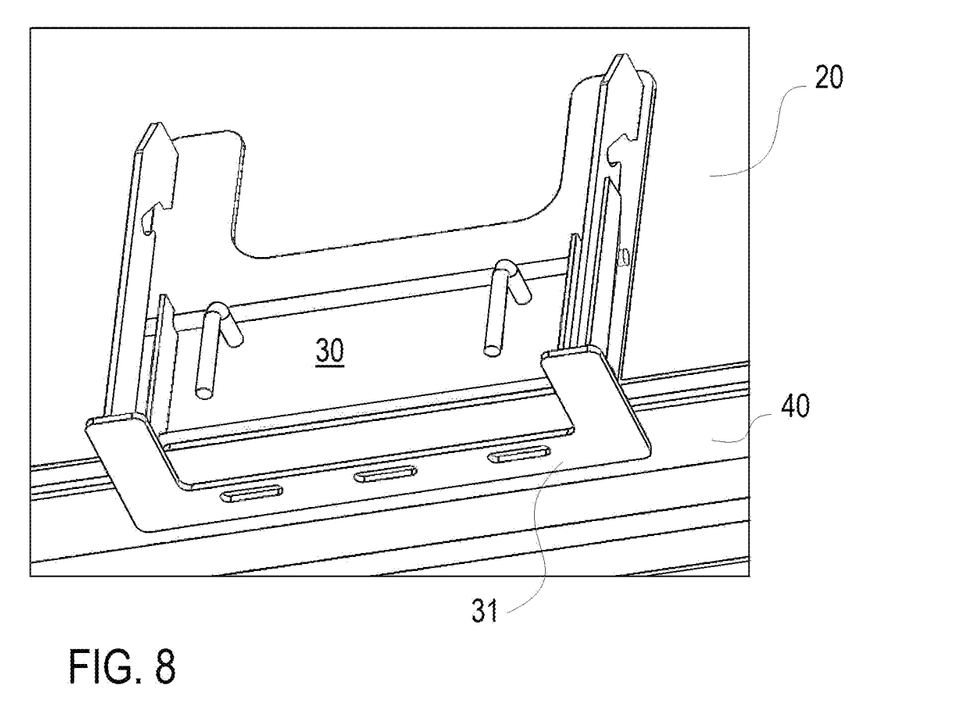
FIG. 8 is a perspective view of a cleanout door design of the gondola car 10 of according to FIG. 1.

The gondola car 10 also includes multiple clean-out doors 30, also called access doors, built into the side wall and floor structure for removing small amounts of residual material from the car and/or to wash out the railcar interior. The clean out/wash out doors 30 can be particularly important if the car 10 is changing from hauling one type of lading to another. Car maintenance is another reason for requiring a thorough removal of residual lading. Typically the cleanout doors 30 are simply hatches or doors that close against the floor of the gondola railcar, examples of which can be seen in U.S. Pat. Nos. 2,681,470; 2,722,899; 7,434,519; 7,461,600; 7,559, 284; 7,757,611; 7,878,125, and 8,025,014 which patents are also incorporated herein by reference, and the door 30 may be formed in these conventional fashions, however the sidewall and floor mounting disclosed in U.S. Patent Publication No 2017/0129504 is preferred and this disclosure is incorporated herein by reference. The preferred cleanout door 30 is formed as generally described in U.S. Patent Publication No 2017/0129504 except with the inclusion of a u-shaped closure plate 31 shown in FIG. 8. The closure plate 31 is added because of the material savings associated with a shorter floor 40 in the railcar 30 than in the design shown in U.S. Patent Publication No 2017/0129504. This door 30 design actually forms a larger opening than in the in U.S. Patent Publication No 2017/0129504. Additionally the slot holding the door in the open position is deeper than shown in U.S. Patent Publication No 2017/0129504 making it more secure and safer preventing unwanted accidental dislodgement during use that could injure a worker. Preferably the top of the bar should be contained entirely within the slot in the stowed position.

Figure 1:
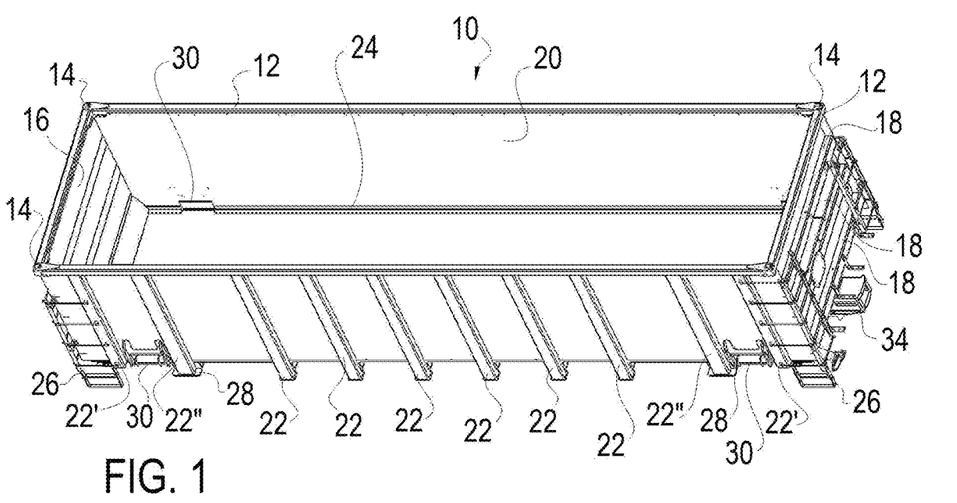
FIG. 1 is a perspective view of a gondola railcar according to the one embodiment of the present invention.
Figure 2:
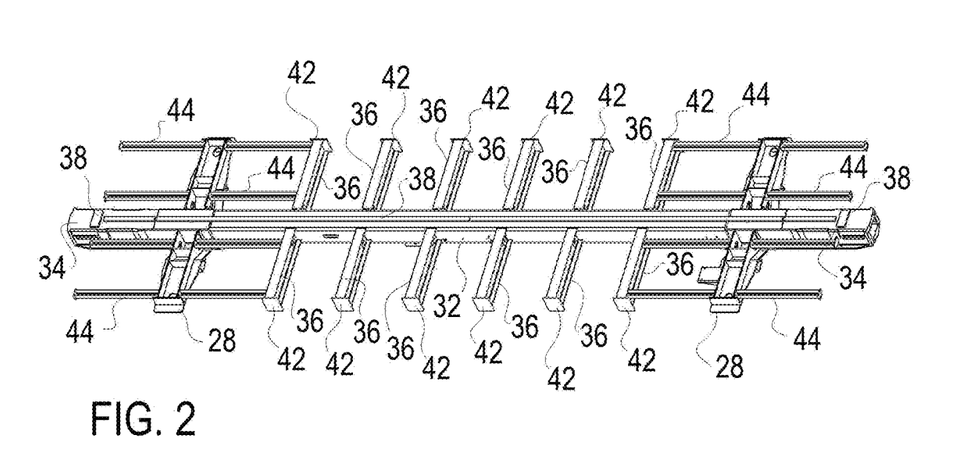
FIG. 2 is a perspective view of the underframe construction of the gondola railcar according to FIG. 1.

FIG. 2 is a perspective view of the underframe construction of the gondola railcar 10 according to the present invention. The underframe uses a center sill 32 running the length of the car with draft sills (also known as end sections or draft arms) 34 at each end. Conventional center sills may be utilized but a cold formed center sill is preferred as described in U.S. Pat. No. 6,769,366 which is incorporated herein by reference. Regarding the draft arms 34, cast arms and fabricated arms are known and either may be used in the railcar 10 although fabricated arms may require transition pieces. Further the arms 34 receive the desired coupler assemblies appropriate for the car 10.

Figure 3:
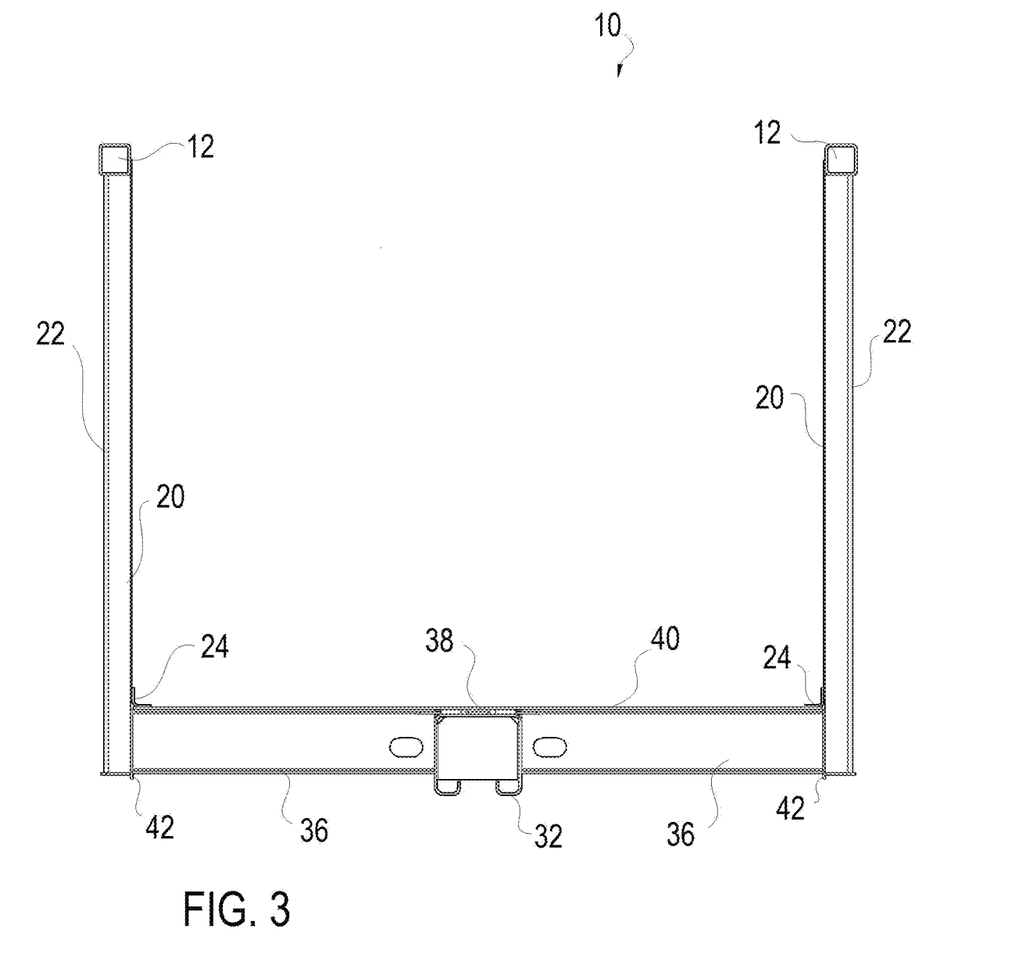
FIG. 3 is a sectional end view taken through a cross bearer of the gondola railcar according to FIG. 1.

The bolsters 28 are above the trucks (partially shown in FIG. 9) and coupled to the center sill 28. Between the bolsters 28 the underframe of the railcar 10 includes a plurality of lateral I-Beam cross bearers 36 that extend from the center sill 32 extending toward but stopping short of the inside of the side sheet 20, as best shown in FIG. 4. The top of the I-Beam cross bearers 36, the flanges, align with and support the floor sheets 40 of the railcar 10. Spacers 38 may be included on the center sill 32 and the draft arm assemblies 34 to align with and couple to the floor sheets 40. The cross bearers 36 include vertical connection plates 42 that allow for coupling to the side stakes 22 as best shown in FIGS. 3 and 4. The underframe includes longitudinal stringers 44 extending from the end cross bearers 36 to the bolster 28 and from the bolster 28 to the end wall structure. The stringers 44 may be formed as channels, S-beam, or possibly t-sections or the like.

FIG. 3 is a sectional end view taken through a cross bearer 36 of the gondola railcar 10 and FIG. 4 is an enlarged sectional end view of the cross bearer 36 and side stake 22 coupling of the gondola railcar 10 according to invention. As described above the I-Beam cross bearers 36 extend from the center sill 32 extending toward but stopping short of the inside of the side sheet 20. The floor sheets 40 also can stop short of the inside of the side sheet 20 as it need only extend to the coupling of the side sill 24, which is preferably either a pressed or structural angle as shown, alternatively, in FIGS. 4 and 5. The side stakes 22 extend from the top chord 12 and are coupled to a cross bearer 36 through a vertical connection plate 42. A side stake cap 46 may be added to the side stakes 22, with weep holes therein to allow the egress of moisture. The side stakes 22 are preferably reinforced as shown in FIGS. 6 and 7.

Figure 6:
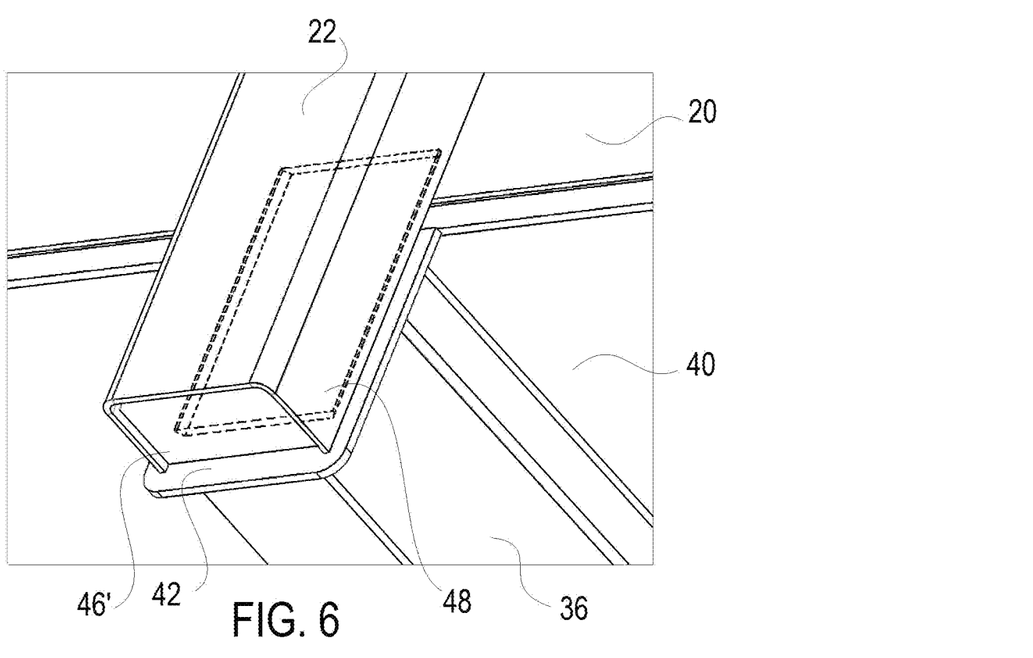
FIGS. 6 and 7 are enlarged perspective views of the reinforced side stake construction of the gondola railcar according to FIG. 1.
Figure 7:
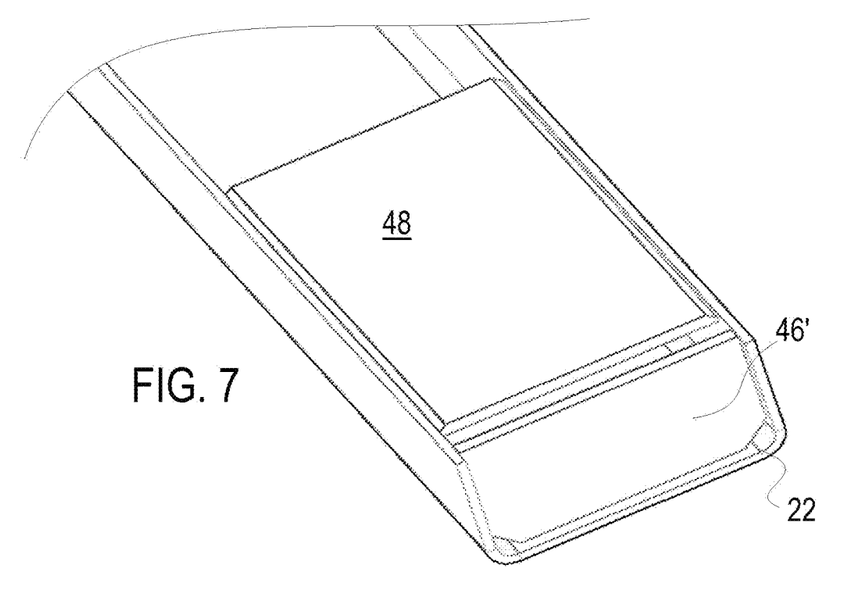

FIGS. 6 and 7 are enlarged perspective views of the reinforced side stake 22 construction of the gondola railcar 10. It is preferred if each side stake 22 includes a stub reinforcing plate 48 within the side stake 22 extending between the legs thereof and extending across the area of the side sill 24. The plate 48 is referenced as a stub plate as it does not extend the entire length of the side stake 22 but reinforces the area of the stake 22 around the side sill 24 through the bottom of the side stake 22. FIGS. 6 and 7 show a modified cap 46' that is fitted into the interior of the side stake 22 and the weep holes can easily be formed as beveled or cut off corners of the plate forming openings (weep holes) in the corners. The internal cap 46' offers some material savings over the cap 46 and the use of this type is most dependent upon the assembly time, namely the internal cap 46" is preferred if it does not add significant assembly time to the overall construction.

The present invention may be described as forming an open top gondola car 10 that includes top chord sections 12;

a pair of end walls and side walls coupled to the top chord structure 12, wherein each sidewall includes a side sheet 20, a plurality of side stakes 22, 22' and 22" and side sill 24; and an underframe construction including a center sill 32 running the length of the car, bolsters 28 configured to be above truck assemblies and coupled to the center sill 32 and a plurality of lateral I-Beam cross bearers 36 that extend from the center sill 32 toward and stopping short of the inside of the side sheet 20, and wherein the cross bearers 36 include vertical connection plates 40 configures for coupling to side stakes 22 which are positioned between the bolsters 28. Every side stake 22, 22' and 22" is welded to the top chord 12 and welded to the side sheet 16 and extending the full height of the side sheet 20. Side stake 22 and 22" extend past the floor to cross supporting structures of the underframe (bolster 28 and cross bearers 36).

Figure 9:
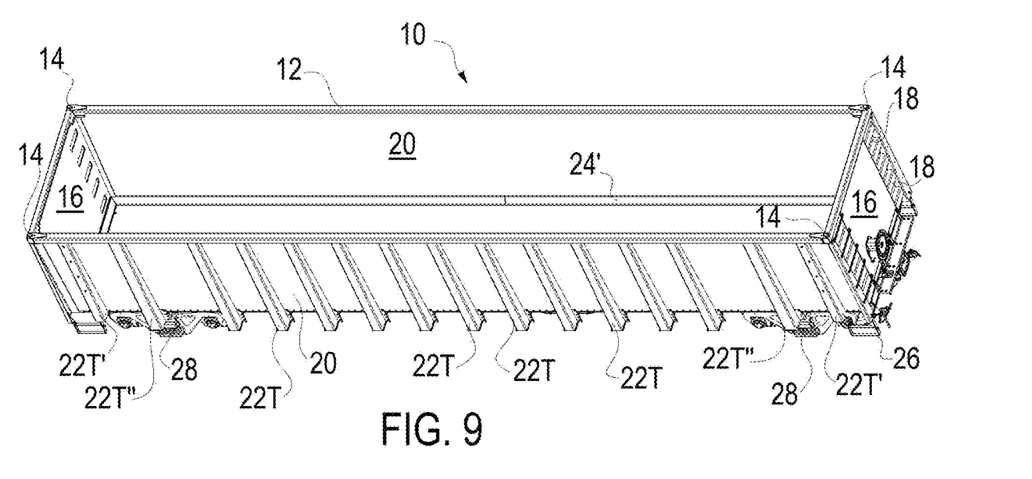
FIG. 9 is a perspective view of a gondola railcar according to another embodiment of the present invention.
Figure 10:
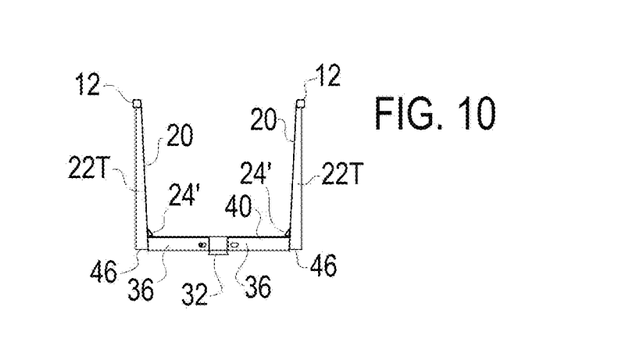
FIG. 10 is a sectional view of the gondola railcar according to FIG. 9.

FIGS. 9 and 10 illustrate an alternative embodiment of the present invention similar to that above in which the railcar 10 includes top chord sections 12 above the sidewalls and end-walls. The end-walls are also formed of internal and external end sheets 16 and intervening cross supports 18. As discussed above, the end sheets 16 can be formed a plurality of coupled sheet materials extending from the top chord 12 to the floor structure, however one piece structure forming each end sheet 16 is preferred. The cross supports 18 may be extruded channel sections, I-beam, t-sections or a variety of supporting beam shapes. However an open channel with corresponding aligned openings in the internal end sheet 16 as shown can form an internal ladder.

The sidewalls are generally formed of side sheet 20, side stakes 22T and side sill 24'. The side sheet 20 can be formed a plurality of coupled sheet materials extending from the top chord 12 to the side sill 24', however a single sheet forming the side sheet 20 is preferred as described above. The side stakes 22T are coupled to the top chord 12 and the side sheet 20 and are preferably mainly formed as extruded channels and will be described further below. The side sill 24' may be a closed section like the top chord 12 as shown (here a triangular closed section), or other conventional shape such as a solid bar, or a pressed angle or structural angle as shown best in FIGS. 4 and 5. Further a key feature of the embodiment of FIGS. 9-10 is the outward taper of the inner face of the legs of side stakes 22T as best shown in FIG. 10.

The ladder side stake 22T' at the ends of each sidewall forms an attaching point for a corner ladder 26 as discussed above, although in this car design the upper ladder is moved to the end wall as shown. The ladder side stake 22T' is not associated with a cross bearer and mainly functions as a side wall support. The second specialized side stake is the bolster side stake 22T" that extends from the top chord 12 to a laterally extending part of a bolster 28 as described above. Every side stake 22T, 22T' and 22T" is welded to the top chord 12 and welded to the side sheet 16 and extending the full height of the side sheet 20. Side stake 22T and 22T" extend past the floor to cross supporting structures of the underframe (bolster 28 and cross bearers 36).

The railcar of FIGS. 9-10 utilizes the underframe construction of the gondola railcar 10 according to the present invention shown in FIG. 2 discussed above and as shown in part in FIG. 10. FIG. 10 is a sectional end view taken through a cross bearer 36 of the gondola railcar 10 of FIG. 9 showing the taper to the side stakes 22T. As described above the I-Beam cross bearers 36 extend from the center sill 32 extending toward but stopping short of the inside of the side sheet 20. The floor sheets 40 also can stop short of the inside of the side sheet 20 as it need only extend to the coupling of the side sill 24. The side stakes 22T extend from the top chord 12 and are coupled to a cross bearer 36. A side stake cap 46 may be added to the side stakes 22T, with weep holes therein to allow the egress of moisture. The side stakes 22T are preferably reinforced as shown and described above in FIGS. 6 and 7.

Although the present invention has been described with particularity herein, the scope of the present invention is not limited to the specific embodiment disclosed. It will be apparent to those of ordinary skill in the art that various modifications may be made to the present invention without departing from the spirit and scope thereof. The scope of the present invention should be defined by the appended claims and equivalents thereto.

What is claimed is:

1. An open top gondola railcar comprising:
   top chord sections;
   a pair of end walls and a pair of sidewalls coupled to the top chord sections, wherein each sidewall includes a side sheet having an inside surface facing an interior of the railcar and an outside surface facing an exterior of the railcar, a plurality of side stakes coupled to the exterior surface of the side sheet of the sidewall, and side sill coupled to an interior surface of the side sheet of the sidewall; and
   an underframe construction including a center sill running the length of the railcar, bolsters configured to be above truck assemblies, wherein each of the bolsters is coupled to the center sill and wherein the side sill of each sidewall extends at least the length of the car between the bolsters, and a plurality of lateral I-Beam cross bearers that extend from the center sill toward and stopping short of the inside surface of the side sheet of one of the sidewalls, wherein a plurality of the cross bearers which are positioned between the bolsters include a vertical connection plate which is coupled to a side stake, wherein a plurality of the side stakes include an outer face surface and a pair of legs extending from the outer face surface, and a stub reinforcing plate within the side stake extending between and coupled to the pair of legs.

2. The open top gondola railcar according to claim 1, wherein each stub reinforcing plate within a side stake does not extend an entire length of the side stake.

3. The open top gondola railcar according to claim 1, wherein each stub reinforcing plate within a side stake reinforces an area of the side stake around the side sill through a bottom of the side stake.

4. An open top gondola railcar comprising:
   top chord sections;
   a pair of end walls and a pair of sidewalls coupled to the top chord sections, wherein each sidewall includes a side sheet having an inside surface facing an interior of the railcar and an outside surface facing an exterior of the railcar, a plurality of side stakes coupled to the exterior surface of the side sheet of the sidewall, and side sill coupled to an interior surface of the side sheet of the sidewall; and
   an underframe construction including a center sill running the length of the railcar, bolsters configured to be above truck assemblies, wherein each of the bolsters is coupled to the center sill and wherein the side sill of each sidewall extends at least the length of the car between the bolsters, and a plurality of lateral I-Beam cross bearers that extend from the center sill toward and stopping short of the inside surface of the side sheet of one of the sidewall, wherein a plurality of the cross bearers which are positioned between the bolsters include a vertical connection plate which is coupled to a side stake, wherein a plurality of side stakes include an outer face surface and a pair of legs extending from the outer face surface, and a cap fitted into an interior of the side stake, and wherein each cap fitted into the interior of the side stake includes weep holes at beveled corners of the cap.

5. An open top gondola railcar comprising:

top chord sections;

a pair of end walls and a pair of sidewalls coupled to the top chord sections, wherein each sidewall includes a side sheet having an inside surface facing an interior of the railcar and an outside surface facing an exterior of the railcar, a plurality of side stakes coupled to the exterior surface of the side sheet of the sidewall, and side sill coupled to an interior surface of the side sheet of the sidewall; and an underframe construction including a center sill running the length of the railcar, bolsters configured to be above truck assemblies, wherein each of the bolsters is coupled to the center sill and wherein the side sill of each sidewall extends at least the length of the car between the bolsters, and a plurality of lateral I-Beam cross bearers that extend from the center sill toward and stopping short of the inside surface of the side sheet of one of the sidewalls, wherein a plurality of the side stakes include an outer face surface and a pair of legs extending from the outer face surface, and outward taper of an inner face of each of the pair of legs of side stake from the side sill to the top chord sections, further including a stub reinforcing plate within at least one of the side stakes extending between and coupled to the pair of legs.

6. The open top gondola railcar according to claim 5, wherein each stub reinforcing plate within a side stake does not extend an entire length of the side stake.

7. The open top gondola railcar according to claim 5, wherein each stub reinforcing plate within a side stake reinforces an area of the side stake around the side sill through a bottom of the side stake.

8. An open top gondola railcar comprising:

top chord sections;

a pair of end walls and a pair of sidewalls coupled to the top chord sections, wherein each sidewall includes a side sheet having an inside surface facing an interior of the railcar and an outside surface facing an exterior of the railcar, a plurality of side stakes coupled to the exterior surface of the side sheet of the sidewall, and side sill coupled to an interior surface of the side sheet of the sidewall; and an underframe construction including a center sill running the length of the railcar, bolsters configured to be above truck assemblies, wherein each of the bolsters is coupled to the center sill and wherein the side sill of each sidewall extends at least the length of the car between the bolsters, and a plurality of lateral I-Beam cross bearers that extend from the center sill toward and stopping short of the inside surface of the side sheet of one of the sidewalls, wherein a plurality of the side stakes include an outer face surface and a pair of legs extending from the outer face surface, and outward taper of an inner face of each of the pair of legs of side stake from the side sill to the top chord sections, wherein a plurality of the side stakes include an outer face surface and a pair of legs extending from the outer face surface, and a cap fitted into an interior of the side stake, and wherein each cap fitted into the interior of the side stake includes weep holes as beveled corners of the cap.

\* \* \* \* \*